Patented Aug. 24, 1954

2,687,395

UNITED STATES PATENT OFFICE 2,687,395

METHYL METHACRYLATE POLYMER OF IMPROVED ELECTRICAL CONDUCTIVITY

Barnard Mitchel Marks, Wilmington, Del., assignor to E. I. du Pont de Nemours and Company, Wilmington, Del., a corporation of Delaware No Drawing. Application March 6, 1951, Serial No. 214,210

6 Claims. (Cl. 260—41)

This invention relates to a process of producing polymers which will conduct an electric current and, more particularly, methyl methacrylate sheeting having improved conductivity.

Polymers produced from liquid polymerizable ethylenically unsaturated compounds, such as various esters of acrylic and methacrylic acids, and derivatives thereof, are well known as poor conductors of electricity and in many cases such polymers, due to their high resistivity, are used as insulating materials. On the other hand, most non-conductive materials, when exposed to frictional forces, collect electrostatic charges on their surfaces at the areas of contact. Depending upon the particular application for a polymeric material, such electrostatic charges are in many instances of an undesirable form because of their attractive nature. Attractive electrostatic charges on polymethyl methacrylate sheeting are particularly undesirable when they are employed for optical, mechanical or ornamental purposes because dust accumulates on the sheeting and seriously impairs the function of the sheeting.

In the past, various coating solutions have been applied to the surfaces of polymeric sheeting for the purpose of reducing the accumulation of electrostatic charges. In general, these coating solutions have been known as anti-static coatings, and such a coating is described and claimed in U. S. Patent 2,463,282 to B. P. Kang. The surface resistivity of methyl methacrylate sheeting is in the neighborhood of $10^{15}$–$10^{16}$ ohms per square, and styrene sheeting has a surface resistivity in the neighborhood of $10^{17}$–$10^{19}$ ohms per square. The application of known anti-static coatings to the surfaces of such polymeric sheeting generally reduces the resistivity of the surface of the polymer to about $10^8$ ohms per square. Hence, such coatings are useful for dispersing electrostatic charges from the surfaces, but in general the coating is not permanent and must be replaced frequently. Furthermore, such anti-static coatings are not useful in producing a polymeric sheet which is a good conductor of electricity.

It is an object of this invention to produce polymers having improved conductivity. Another object is to provide methacrylate polymers having reduced electrical resistivity. It is a more specific object to provide a process of casting transparent or translucent polymeric sheeting to give products of increased conductivity. Other objects will be apparent from the description of the invention.

The above objects are accomplished according to the present invention by dissolving in methyl methacrylate at least 5%, by weight of said methacrylate, of a metal halide such as aluminum, zinc or stannic halide, the halide being the chloride, bromide or iodide, and thereafter polymerizing said polymerizable compound by subjecting it to polymerization conditions. The resulting resins are transparent to visible light and have surface resistivities between $2\times10^3$ and $2\times10^{12}$ ohms per square.

In actual practice, a homogeneous mixture of the polymerizable liquid and the metal halide is prepared prior to polymerization, the resulting solution being polymerized in the presence of a suitable catalyst for the reaction. The chlorides, bromides and iodides of aluminum, zinc and tin (in stannic form) have been found to be directly soluble in methyl methacrylate. On the other hand, the use of mixtures of the above metal halides with other metal halides, such as the chlorides, bromides and iodides of magnesium, calcium, strontium, and tin (in stannous form) requires the addition of small amounts of a solvent such as an aliphatic alcohol or an aliphatic carboxylic acid in order to form a homogeneous solution of the metal halides in the polymerizable liquid. Solutions containing as much as 90–100%, by weight of monomeric methyl methacrylate, of a metal halide may be polymerized using well-known polymerization techniques to form a substantially clear sheet. The conductivity of the resulting polymeric body or sheet depends upon the amount of metal halide dissolved therein. To obtain a polymer which has a resistivity low enough to disperse electrostatic charges, at least 5% of the metal halide, based upon the weight of polymerizable liquid, should be employed. As the concentration of the metal halide increases, the resistivity of the final polymer is decreased. Normally, to prepare a polymer suitable for conducting an electric current, from 30% to 120% of the metal halide, based upon the weight of polymerizable liquid, is dissolved in the polymerizable liquid.

The following examples, in which all parts are by weight unless otherwise indicated, illustrate preferred embodiments of the invention.

*Example 1.*—The following ingredients were added to 100 parts of monomeric methyl methacrylate.

| | Parts |
|---|---|
| Zinc chloride | 50 |
| 1% solution of dioctyl sodium sulfosuccinate in monomeric methyl methacrylate | 25 |
| Alpha,alpha'azodiisobutyronitrile (a polymerization catalyst) | 0.25 |

The above materials were mixed until a homogeneous solution was produced. The resulting solution was poured into a cell composed of two glass plates (¼" x 12" x 12") separated by a compressible gasket in accordance with the process of U. S. Patent 2,154,639, Rohm et al. The gasket was of such thickness that a sheet 0.1 inch in thickness was produced. The glass cell was sealed and placed in a circulating hot-air oven at 45° C. for 16 hours. After that time the temperature was raised to 100° C. and held for 1 hour.

The resulting polymeric sheet was transparent. The resistivity of sheet was measured by balancing areas of the sheet between test electrodes against standard resistances. The surface resistivity was $1 \times 10^6$ ohms per square.

*Example 2.*—The following ingredients were added to 75 parts of methyl methacrylate monomer:

|   | Parts |
|---|---|
| Stannic chloride | 75 |
| Magnesium chloride | 40 |
| Methyl alcohol (solvent) | 40 |
| Benzoyl peroxide | 0.50 |

The above mixture was mixed to form a homogeneous solution. The solution was introduced into the same type of casting cell used in Example 1, and the conditions of polymerization were the same.

The resulting transparent sheet had a surface resistivity of $6 \times 10^5$ ohms per square.

In this example the magnesium chloride is not soluble in monomeric methyl methacrylate unless stannic chloride and methyl alcohol are added.

*Example 3.*—The following ingredients were added to 100 parts of monomeric methyl methacrylate:

|   | Parts |
|---|---|
| Stannic chloride | 115 |
| Alpha,alpha'azo-diisobutyronitrile | 0.25 |

The above composition was mixed to form a homogeneous solution and the resulting solution was poured into a casting cell. In this example one of the glass plates was replaced with a sheet of methyl methacrylate (¼" x 12" x 12"), and polymerization was carried out in the same manner illustrated in Example 1. This produced a composite comprising a sheet of pure methyl methacrylate and a thin layer about 0.06" of conductive methyl methacrylate. The composite had a surface resistivity of $5 \times 10^7$ ohms per square.

This example illustrates the practicability of coating materials with a conductive polymeric layer.

The following table summarizes further examples which illustrate the present invention. The sheets used for testing the resistivity were polymerized in the same manner described in Example 1, the resulting sheets ranging from 0.060" to 0.15" in thickness. Furthermore, a wetting agent, dioctyl sodium sulfosuccinate, was used to facilitate stripping of the polymeric sheet from the glass cells. In all cases 0.25 part of alpha,alpha'-azodiisobutyronitrile per 100 parts of monomeric methyl methacrylate was used as the polymerization catalyst. The quantity of each ingredient in the methyl methacrylate is expressed as parts by weight. The ingredients listed under the term lubricant are added for the purpose of further facilitating stripping of the polymeric sheeting from the cell. In all cases the resulting sheeting was transparent or translucent.

*Table I*

| Example | Monomeric Methyl Methacrylate | Metal Halide | Stripping Agent (Dioctyl Sodium Sulfosuccinate) | Solvent | Lubricant | Surface Resistivity ohms per sq. |
|---|---|---|---|---|---|---|
| 4 | 100 | 30-SnCl$_4$.5H$_2$O | 10-1% sol. in monomer |   |   | $2 \times 10^9$ |
| 5 | 100 | {10-SnCl$_4$.5H$_2$O / 10-SnCl$_2$.2H$_2$O} | 2.5-10% sol. in monomer | 20-CH$_3$OH |   | $3 \times 10^5$ |
| 6 | 100 | 50-AlCl$_3$ | 1-10% sol. in monomer |   |   | $8.6 \times 10^8$ |
| 7 | 100 | 30-ZnCl$_2$ | 4 |   |   | $3.3 \times 10^6$ |
| 8 | 100 | 30-ZnCl$_2$ | 5 |   | 2-stearic acid | $2 \times 10^6$ |
| 9 | 100 | {30-SnCl$_4$ / 15-AlCl$_3$} | 5 |   | 2.5 stearic acid | $5 \times 10^5$ |
| 10 | 200 | 60-ZnCl$_2$ | 12 |   | 6-stearic acid | $2 \times 10^5$ |
| 11 | 100 | 90-ZnCl$_2$ | 6 |   | 3-stearic acid | $4 \times 10^4$ |
| 12 | 100 | 30-ZnCl$_2$ | 3 |   |   | $1.9 \times 10^{10}$ |
| 13 | 100 | 115-ZnCl$_2$ | 6 | 2-acetic acid | 3-acetic acid | $5 \times 10^4$ |
| 14 | 75 | {75-SnCl$_4$ / 20-AlCl$_3$.6H$_2$O} |   | 35-CH$_3$—OH |   | $2 \times 10^4$ |
| 15 | 75 | {75-SnCl$_4$ / 20-MgCl$_2$} |   | 30-CH$_3$—OH |   | $2 \times 10^4$ |
| 16 | 75 | {75-SnCl$_4$ / 20-CaCl$_2$} |   | 60-CH$_3$—OH |   | $3 \times 10^4$ |
| 17 | 75 | {75-SnCl$_4$ / 20 anhy. SrCl$_2$} |   | {40-CH$_3$OH / 6-acetic acid} |   | $5.5 \times 10^4$ |
| 18 | 100 | {30-ZnCl$_2$ / 20 anhy. SrCl$_2$} |   | 6-acetic acid |   | $3 \times 10^5$ |

The foregoing examples illustrate that anhydrous or hydrated metal halides can be used. In most cases anhydrous metal halides are employed for it is difficult to dissolve highly hydrated metal halides in methyl methacrylate or the like without the aid of a small amount of a suitable solvent.

When metal halides which are not directly soluble in methyl methacrylate are used, their solubility can be improved by using them in combination with aluminum, zinc or stannic halides with the aid of a solvent. Such combinations of metal halides appear to produce polymers of higher conductivity than with an aluminum, zinc or stannic halide alone. Any suitable solvent which will not materially alter the physical properties of the resulting polymer may be employed. Suitable solvents include the aliphatic saturated alcohols such as methyl, ethyl, propyl, butyl, amyl, alcohols, etc. or the saturated aliphatic carboxylic acids such as formic, acetic, propionic, butyric, etc.

Calcium, magnesium, strontium and stannous halides are not directly soluble in methyl methacrylate. Furthermore, they are not highly soluble even when incorporated with a suitable solvent. It has been found that only the combination of these halides with an aluminum, zinc or stannic halide and a suitable solvent gives a clear solution in various acrylic and methacrylic acid esters.

An alternate method of incorporating the metal salts into the polymeric methyl methacrylate to give a light transmissible resin may be accomplished by the addition of the metal salt directly to a solution of the polymer. For example, into a solution of polymeric methyl methacrylate in a mixed solvent of acetone and methanol, present in the ratio of about 2:1 by volume, are added the metal halides described above. This and other solutions may be used providing a mutual solvent for both the polymer and the metal halide is present. Subsequent to solution of the polymer and the metal halide, the solvent is evaporated to give a transparent metal halide resin film. These solutions are particularly well adapted for applying thin conducting layers of the resin on conducting or non-conducting materials by simply brushing, spraying or otherwise coating the mutual solution of the resin and salt on the material. With a metal salt content of from 5 to 10% by weight of the polymer, such coatings have a surface resistivity of $2 \times 10^{11}$ or less ohms per square and are substantially anti-static.

As has been stated, to obtain any appreciable increase in conductivity at least 5% of a metal halide, based upon the weight of polymerizable liquid, must be employed. Small quantities in the neighborhood of 5–10% serve as anti-static agents, and the resulting polymer has a conductivity high enough to prevent the accumulation of electrostatic charges upon surfaces. As the amount of metal halide is increased, the conductivity of the resulting polymer increases, the upper limit on the amount of metal halide depending upon the solubility of the metal halide in the polymerizable liquid. From a practical standpoint, excessive quantities of metal halide may materially alter the physical properties of the polymer to the extent that the polymer is useless for particular applications. On the other hand, however, the amount of metal halide must be sufficient to produce a polymer of satisfactory conductivity, and this will depend upon the particular application. In some cases as much as about 120% of the metal halide, or metal halide mixtures, based upon the weight of polymerizable liquid, has been employed. Usually from 30% to 90% gives ample decrease in resistivity.

The present invention is concerned principally with increasing the conductivity of polymerized methyl methacrylate and is not broadly applicable to liquid polymerizable compounds generally. However, the present invention does contemplate the addition to the liquid methyl methacrylate or to solutions of polymeric methyl methacrylate, not only conventional modifiers as mentioned above but also minor proportions of other liquid polymerizable compounds as styrene, various acrylates, methacrylates, ethacrylates and the like or polymers thereof. Those skilled in the art will appreciate that such additions should be restricted to minor proportions as they obviously have a tendency to affect the solubility of the metal halides in methyl methacrylate.

The process of the present invention and the products produced thereby may be used in a wide variety of applications. The metal halide containing polymers eliminate the need of anti-static coatings. More important is the fact that conductive methyl methacrylate sheeting or coating compositions may be employed in a recently introduced method of producing illumination. This method, called "Electroluminescence," is discussed in an article in "Illuminating Engineering," 688–693, November 1950, titled "Electroluminescence—A new method of producing light" by E. C. Payne, E. L. Mager and C. W. Jerome. In brief, electroluminescence comprises exciting to luminescence in a fluctuating electric field, certain materials which emit light as long as the exciting field is maintained. This is brought about by using a type of luminous capacitor which is a composite comprising a sheet of transparent or translucent conductive material, a coating of phosphor suspended in a suitable dielectric, and a metallic conductor. As a current is passed through the capacitor the phosphor is excited to emit light through the transparent or translucent conductive material. The present invention provides such a transparent or translucent conductive material, and this may be a conductive sheet of polymer such as methyl methacrylate or it may be composed of a sheet of unmodified methyl methacrylate or other polymer which has been coated with a conductive layer of the metal halide-containing methyl methacrylate polymer.

In addition to various illuminating applications, the metal halides of this invention may be used for forming electric circuits. This may be accomplished by preparing a relatively viscous solution of a metal halide in a polymerizable syrup. The syrup can be poured onto a pattern or wiring diagram, and the syrup subjected to polymerization conditions.

Any known technique of thermal polymerization or photo-polyremization may be used in the present process. The examples have illustrated the conventional method of casting sheets of methyl methacrylate and the like in glass cells separated by a compressible gasket as described in U. S. Patent 2,154,639 to Rohm et al. In general, a polymerization catalyst will usually be mixed with the polymerizable liquid. Such catalysts and the proportions in which they are desirably used are known to the art. Preferred photopolymerization catalysts include benzoin, benzoin methyl ether, benzoin ethyl ether, and various azo catalysts such as alpha, alpha'-azodiisobutyronitrile as well as alpha,alpha'azobis-(alpha(gamma-dimethylvaleronitrile), alpha,alpha'-azodiisobutyronitrile and other azo compounds disclosed in U. S. Patent 2,471,959 to Madison Hunt.

I claim:

1. A process for the preparation of light-transmissible polymeric methyl methacrylate having surface resistivity between about $2 \times 10^3$ and $2 \times 10^{12}$ ohms per square, which comprises dissolving a metal halide of the group consisting of aluminum, zinc and stannic halides of the group consisting of chlorides, bromides and iodides in monomeric methyl methacrylate to give a homogeneous solution of from 5% to 120% of the metal halide in the monomeric methyl methacrylate and thereafter polymerizing the homogeneous solution in the absence of water that is chemically uncombined and in the presence of a polymerization catalyst.

2. The process of claim 1 in which the solution of the metal halide in the monomeric methyl methacrylate is aided by the presence of a solvent of the group consisting of aliphatic alcohols and aliphatic carboxylic acids.

3. In a process for the preparation of light-transmissible polymeric methyl methacrylate sheets having reduced electrical resistivity, the steps which comprise dissolving in monomeric methyl methacrylate, in the absence of water that is chemically uncombined, from 30 to 120%, by weight of the methyl methacrylate, of a metal halide of the group consisting of aluminum, zinc and stannic halides, the halides being of the group consisting of chlorides, bromides and iodides, and thereafter polymerizing the methyl methacrylate in the presence of a polymerization catalyst.

4. In a process for the preparation of light-transmissible polymeric methyl methacrylate sheets having reduced electrical resistivity, the steps which comprise preparing, in the absence of water that is chemically uncombined, a homogeneous solution in monomeric methyl methacrylate of monomeric methyl methacrylate and from 5 to 120% by weight of a metal halide of the group consisting of aluminum, zinc and stannic halides, together with a metal halide of the group consisting of magnesium, calcium, strontium and stannous halides, and thereafter polymerizing the homogeneous solution in the presence of a polymerization catalyst, the halides being of the group consisting of chlorides, bromides and iodides.

5. Light-transmissible sheets of polymeric methyl methacrylate containing no water that is chemically uncombined having reduced electrical resistivity, and containing from 30 to 120% of a metal halide based on the weight of the methyl methacrylate, the metal halide being selected from the group consisting of aluminum, zinc and stannic halides, the halides being of the group consisting of chlorides, bromides and iodides.

6. The product of claim 5 containing a metal halide of the group consisting of magnesium, calcium, strontium and stannous halides, the halides being of the group consisting of chlorides, bromides and iodides.

References Cited in the file of this patent

UNITED STATES PATENTS

| Number | Name | Date |
| --- | --- | --- |
| 1,980,483 | Hill | Nov. 13, 1934 |
| 2,356,767 | Kropa | Aug. 29, 1944 |
| 2,537,970 | Fields | Jan. 16, 1951 |
| 2,570,861 | Roedel | Oct. 9, 1951 |